Patented June 14, 1932

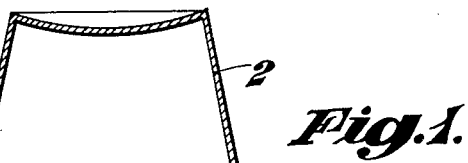
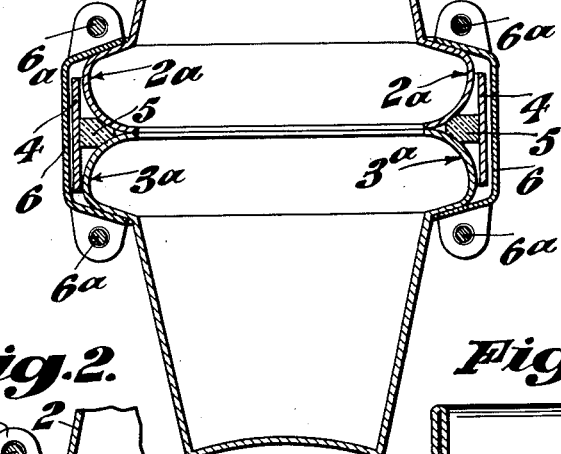
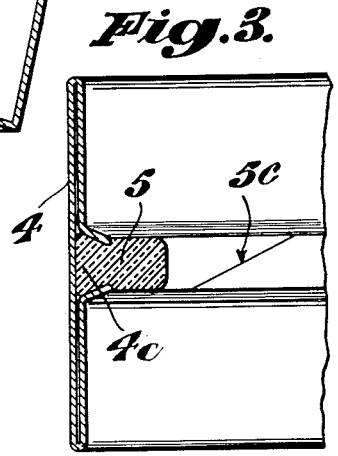
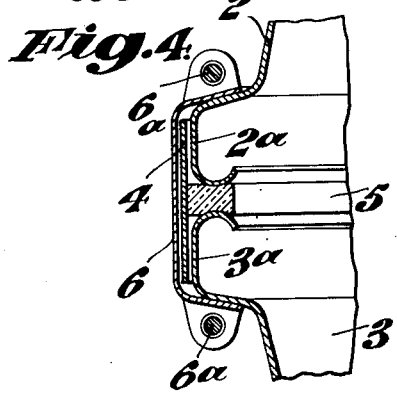
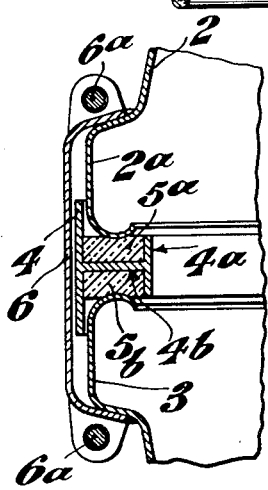

1,863,122

UNITED STATES PATENT OFFICE

MATTHEW HENRY MATTHEWS, OF LONDON, ENGLAND, ASSIGNOR TO THE KENWARD BARREL COMPANY LIMITED, OF LONDON, ENGLAND

NESTING BARRELS OR CONTAINERS

Application filed December 23, 1927, Serial No. 242,222, and in Great Britain January 6, 1927.

This invention relates to nesting barrels or containers.

Nesting barrels or containers have frequently been proposed which consist in general of duplicate members which when the barrel is in use are held together at their open ends by some sort of a central joint and when not in use are packed for transport by nesting one half of the barrel within the other.

The important element of such barrels is of course, the joint which, at any rate in the case of liquids must be leak-tight and must be capable of being easily and quickly made and many suggestions have been made from time to time to meet the requirements. Many of the packing materials tried in such joints suffer from the defect that they are not sufficiently resilient or deformable to make a good joint initially unless the surfaces of the container elements are machined and maintained true, which is not possible in ordinary commercial practice. Rubber does not suffer from this defect but it is not suitable for the joint packing of receptacles containing liquids which act upon it detrimentally such as petroleum and hydrocarbon oils generally.

The object of my present invention is to provide a container of the foregoing character with a joint such as can be readily made and unmade and which will better meet the general requirements.

The present invention comprises a joint for containers having two parts held together at their open ends to form a fluid-tight joint, consisting of an annular centralling member carrying a resilient and compressible washer adapted to be compressed on opposite sides by the opposing open ends of the two parts of the container when they are drawn together axially by a housing band or other securing device.

The washer of resilient material may be supported at one edge by the centralling member, and may be a flat ring engaged on opposite sides of one edge by opposing conical surfaces on the open ends of the two parts of the container so that when the two parts are drawn together the other edge of the washer will be forced against the centralling member.

Various methods of carrying out the invention are illustrated diagrammatically by the accompanying drawing, wherein Figure 1 is a general sectional view of a container having a joint made in accordance with the present invention, Figure 2 a sectional view of a portion of the joint thereof on an enlarged scale. Figure 3 is a sectional view of a modification of a method of securing the packing washer to the centralling member, Figure 4 is a modification of the device shown in Figure 2, and Figure 5 is a further modification in which two resilient packing washers are used.

In the drawing 2 and 3 are the two parts of the container or barrel and these parts are of the kind made of steel or other suitable material, their abutting or meeting edges being rolled over to form convex rims 2a and 3a.

The centralling member is a band 4 of steel or other suitable material, and fixed on the inner side of the band 4 by its outer edge is a washer 5 of a suitable resilient material.

In Figures 1 and 2 the parts 2 and 3 of the container are held together and against the washer 5 by means of a housing 6 consisting of two semi-circular parts held together by bolts 6a. The housing 6 has conical surfaces 6b adapted to engage rounded or similar conical surfaces 6c formed on the beads 2a and 3a of the two parts 2 and 3 of the container. Figure 2 shows the washer 5 of resilient material being engaged at opposite sides of its inner edge by the conical surfaces of the rolled in edges of the two parts 2 and 3 of the container, the resultant action of such conical surfaces on the resilient washer 5 forces its outer edge in engagement with the centralling member or ring 4.

In the modification of the device as shown in Figure 3, the centralling ring 4 is formed from a strip of sheet metal by folding each side over on itself and bending its edges to form a dovetail recess 4c into which the ring 5 of resilient material is forced.

In assembling such a barrel or container one of the barrel elements say 3 is placed mouth upwards on the ground, the centralizing member 4 is then arranged in position with the washer 5 or edge thereof resting on the conical portion of the curved rim 3a of the barrel element the other barrel element 2 is then inverted and dropped in place on the washer 5 so that its curved rim or the tapering portion thereof engages the jointing washer 5. The housing member 6 is then placed over the joint and secured by the bolts 6a.

The housing member 6 may be of any other suitable form provided with means for drawing the two parts 2 and 3 of the container together axially and thus cause their curved rims to engage the resilient washer with sufficient force to form a tight joint.

The resilient washer 5 or packing proper may be made in lengths or segments to facilitate manufacture and assembly especially when used as in Figure 3 when it is inserted in the groove 4c in the centralling band 4. These segments may be cemented together and in the centralling band 4 or groove 4c therein, and in order to increase the tightness of the joints of the packing segments they may be connected together by scarved joints as at 5c Figure 3. In another method of connecting the segments of the packing ring together the flanges forming the sides of the packing receiving groove are so made that they can be forced towards each other at various points and more particularly over the joints of the segments of the packing rings.

In the modifications shown in Figures 4 and 5 the resilient packing 5, 5a and 5b is compressed axially only that as pressure is applied on the opposite faces of the packing only.

In Figure 5 the centralling member 4 is formed with a web portion 4b having an inner flange 4a thereby forming two oppositely disposed grooves in which are fixed respectively resilient washers 5a and 5b. The other details of Figures 4 and 5 are the same as in Figure 2 and are given the same reference numerals.

The flanges or sides of the packing receiving groove in the centralling band 4 may be formed in any suitable manner such as by rolling them or by forming them on the inner edges of cylindrical bands secured inside the main band a distance apart to leave a packing groove of the desired width.

In nesting the two empty members of the barrel the band is placed over the open end of the first member and the second member nested in the first, and so on for any desired number of barrels.

It will be found that barrels constructed as aforesaid can be assembled with unskilled labour and can be made leak-proof and unaffected by contents of the barrel even though such contents be hydrocarbon oils.

The method described above of supporting the packing proper also provides a reinforcing member protecting the device against damage by external contact, the outer surface of the band or housing when such is used also provides a rolling surface facilitating the rolling of the barrel from place to place.

What I claim and desire to secure by Letters Patent is:—

1. A joint for containers having two parts held together at their open ends on a resilient washer, comprising beaded edges formed on the open ends of the containers, a rigid hollow cylindrical centralling member for controlling the two parts when placed together with their open ends in contact, a resilient and compressible washer and means for drawing the open ends of the two parts of the container together, the resilient washer being fixed at its outer edge to the inner surface of the rigid hollow cylindrical centralling member, while its inner edge extends freely between the open ends of the two parts of the container and the rigid hollow cylindrical centralling member extends freely over the beaded edges of both parts of the container independently of the means for holding the two parts of the container together.

2. A joint for containers having two parts held together at their open ends on a resilient washer, comprising beaded edges formed on the open ends of each part of the container, a resilient washer, an independent rigid centralizing member for the two parts of the container when in contact with each other, means for drawing the beaded edges together and at the same time forcing the resilient washer radially outwards against the centralizing member, the means for drawing the beaded edges together operating independently of the centralizing member.

3. A joint for containers having two parts held together at their open ends, comprising beaded edges having conical portions and formed on the open ends of each part of the container, a resilient washer, a rigid hollow cylindrical centralling member extending freely over the beaded edges of both containers when in contact with each other, and means for drawing the two beaded edges together so that their conical portions will engage the resilient washer on its opposite sides without said means engaging the centralling member.

4. A joint for containers having two parts held together at their open ends, comprising beaded edges formed on the open end of each part of the container, a rigid hollow cylindrical centralling member, a resilient washer and a housing, the resilient washer being fixed at its outer edge to the inner surface of the annular member while its inner edge extends between the beaded edges, and the annular member extends freely over both beaded edges, and the housing arranged to enclose both beaded edges and made of two detachable semicircular parts fastened together over the beaded edges independently of the centralling member.

5. A joint for containers having two equal parts held together at their open ends, comprising beaded edges having conical portions and formed on the open end of each part of the container, a resilient washer, a rigid hollow cylindrical centralling member extending freely over both beaded edges, and a housing, the housing being arranged to enclose both beaded edges and force them together with their conical portions engaging the inner opening of the resilient washer, and made of two detachable semi-circular parts fastened together over the beaded edges independently of the centralling member.

In witness whereof I affix my signature.

MATTHEW HENRY MATTHEWS.